(12) United States Patent
Schorn et al.

(10) Patent No.: US 11,377,061 B2
(45) Date of Patent: Jul. 5, 2022

(54) AIRBAG FLAP SYSTEM HAVING PERIPHERAL DEPRESSIONS OF VARIABLE MATERIAL THICKNESS

(71) Applicant: StreetScooter GmbH, Aachen (DE)

(72) Inventors: Klaus Schorn, Cologne (DE); Waltraud Renn, Jülich (DE); Dennis Shallar, Konz (DE); Cosmin Florian Radulescu, Cologne (DE)

(73) Assignee: StreetScooter GmbH, Aachen (DE)

( * ) Notice: Subject to any disclaimer, the term of this patent is extended or adjusted under 35 U.S.C. 154(b) by 0 days.

(21) Appl. No.: 17/063,774

(22) Filed: Oct. 6, 2020

(65) Prior Publication Data

US 2021/0101555 A1 Apr. 8, 2021

(30) Foreign Application Priority Data

Oct. 7, 2019 (DE) ...................... 10 2019 126 901.6

(51) Int. Cl.
*B60R 21/2165* (2011.01)
*B60R 21/205* (2011.01)

(52) U.S. Cl.
CPC ........ *B60R 21/2165* (2013.01); *B60R 21/205* (2013.01)

(58) Field of Classification Search
None
See application file for complete search history.

(56) References Cited

U.S. PATENT DOCUMENTS 6,669,228 B2 * 12/2003 Shah .................. B29C 44/0407
264/51
6,902,185 B2 * 6/2005 North .................. B60R 21/2165
280/728.3

(Continued)

FOREIGN PATENT DOCUMENTS

CN 101678811 A * 3/2010 ......... B60R 21/2165
CN 107804266 3/2018

(Continued)

*Primary Examiner* — Faye M Fleming
(74) *Attorney, Agent, or Firm* — Dority & Manning, P.A.

(57) ABSTRACT

The subject matter of the invention is an airbag flap system for triggering an airbag of a vehicle dashboard in a fragment-free manner at sub-zero temperatures, having:
a lid assembly which points towards a vehicle interior and which comprises a polymer, wherein the lid assembly has a frame body having at least one flap segment which has peripheral depressions;
wherein the peripheral depressions generate at least one rectangular basic structure; and
a deployment chute assembly which is connected to the lid assembly and comprises a polymer, wherein the deployment chute assembly has a main body and at least one flap body;
wherein the main body is configured so as to cover the frame body, and wherein the at least one flap body is configured so as to cover the at least one flap segment;
wherein the peripheral depressions of the rectangular basic structures of the lid assembly have at least two different material thicknesses.
The present invention also relates to a lid assembly for the afore-mentioned airbag flap system. The present invention furthermore relates to a deployment chute assembly for the afore-mentioned airbag flap system.

16 Claims, 4 Drawing Sheets

(56) References Cited

U.S. PATENT DOCUMENTS

| | | | |
|---|---|---|---|
| 7,780,186 B2 * | 8/2010 | Maertens | ............ B60R 21/2165 |
| | | | 280/728.2 |
| 2005/0184488 A1 | 8/2005 | Yasuda et al. | |
| 2006/0202448 A1 | 9/2006 | Sawada et al. | |
| 2010/0230939 A1 * | 9/2010 | Mazzocchi | ............. B29C 44/12 |
| | | | 280/732 |

FOREIGN PATENT DOCUMENTS

| | | | | |
|---|---|---|---|---|
| CN | 112829709 A | * | 5/2021 | ............ B60R 21/215 |
| DE | 19715033 A1 | * | 10/1998 | ............ B60R 21/205 |
| EP | 1403148 | | 3/2004 | |
| EP | 1700755 | | 9/2006 | |
| KR | 19990067426 A | * | 8/1999 | ............. B29C 59/16 |

* cited by examiner

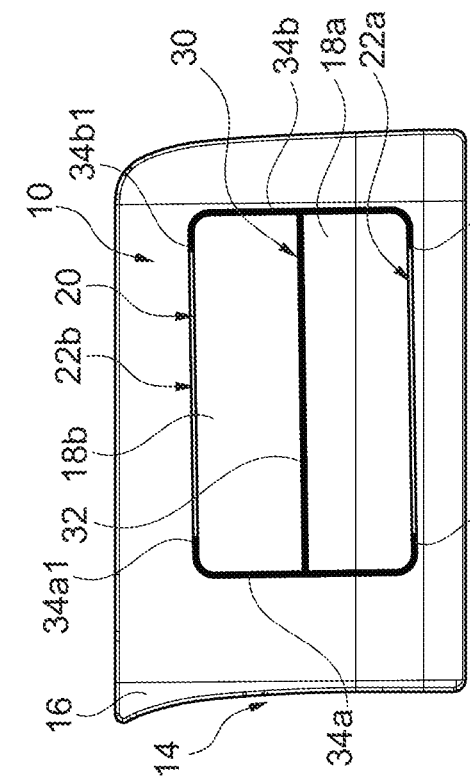
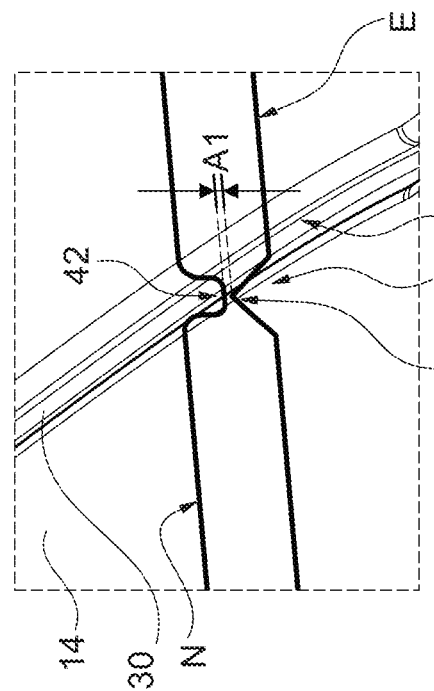
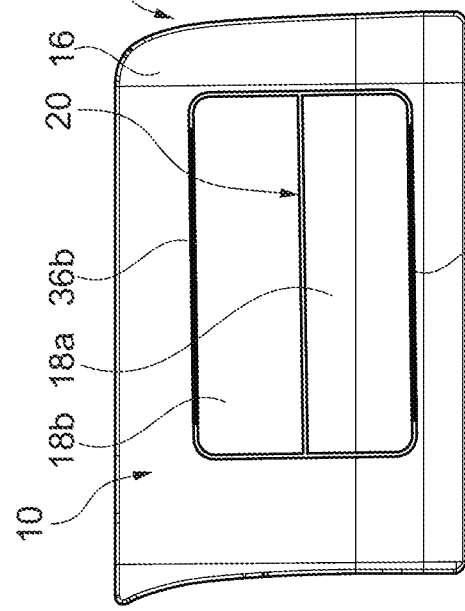
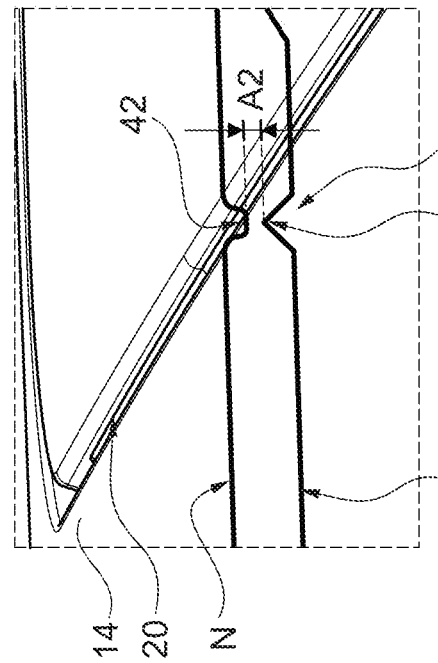

AIRBAG FLAP SYSTEM HAVING PERIPHERAL DEPRESSIONS OF VARIABLE MATERIAL THICKNESS

PRIORITY CLAIM

The present application is based on and claims priority to German Application 10 2019 126 901.6 having a filing date of Oct. 7, 2019, which is incorporated by reference herein.

TECHNICAL FIELD

The invention relates to an airbag flap system for triggering an airbag of a vehicle dashboard in a fragment-free manner at sub-zero temperatures.

The present invention also relates to a lid assembly for an afore-mentioned airbag flap system.

The present invention furthermore relates to a deployment chute assembly for an afore-mentioned airbag flap system.

BACKGROUND TO THE INVENTION

In the production of a vehicle, airbags for safety reasons and for improving the design on a vehicle dashboard are covered with a lid assembly which points towards a vehicle interior. In order for the airbag to function when triggered, the lid assembly is conceived such that the latter can easily break or easily tear, respectively, at predefined breaking points, the latter being peripheral depressions in comparison to the other regions of the lid assembly, and on account thereof can allow the airbag to pass through. The airbag penetrates or breaks through, respectively, the lid assembly in a previously established predetermined breaking region. A predetermined breaking region is surrounded by a predetermined breaking contour which is defined by the peripheral depressions. In the event of stress on account of the airbag the predetermined breaking region is intended to break or tear, respectively, along the predetermined breaking contour. To this end, the lid assembly is in most instances weakened along the predetermined breaking contour. Various methods for weakening the predetermined breaking contour are known in the prior art. The methods can be divided substantially into two generic types. On the one hand, there are post-production methods which are applied after the production of the lid assembly, for example by thermal or mechanical processing such as laser machining, and on the other hand there are integral methods which are applied in an integral manner in the production of the lid assembly. Methods after the production of the lid assembly are expensive and temporally complex on account of additional machines, operating steps, storage costs, handling times and waiting times. In methods which are used in an integral manner in the production of the lid assembly, the weakening of the trim element by a predetermined breaking contour often stands out on a visible side which faces the vehicle occupants such that lines and various contours and structures can be seen which in most instances are considered unaesthetic and annoying. In order for a face that is aesthetic, visually flawless, and at the same time functional, to be produced on the visible side, further machines, operating steps, storage costs, handling times and waiting times are required, which additionally increases the production costs.

Part of the vehicle occupant-restraint system of motor vehicles is typically referred to as an airbag. The airbag in the motor vehicle is typically composed of a plastic bag which in the event of an accident unfolds with a loud bang within 20 to 50 milliseconds between the vehicle occupant and parts of the vehicle interior. It is prevented on account thereof that the vehicle occupant impacts hard parts of the interior such as the steering wheel or the vehicle dashboard. The airbag system is triggered only by highly negative acceleration values beyond values such as achieved solely by a full application of the brakes. Vehicles can be equipped with a multiplicity of airbags. Only specific airbags are triggered, depending on the deceleration of the vehicle and the angle of collision.

It is provided by law in many jurisdictions that airbags must function in a reliable manner and no fragments which could injure the vehicle occupants must be created in the triggering. In this context, a testing method in which airbags are triggered in various experiments in a range from minus 35 degrees Celsius inclusive to at least 80 degrees Celsius has been established with automobile manufacturers. Many of the visible plastics materials of the lid assembly currently used cannot meet this requirement since said plastics materials become brittle at low temperatures and parts which break out through the airbag flap system when the airbag is triggered form splinters and sharp edges. The triggering thus does not take place in a fragment-free manner.

It is furthermore to be taken into account that the costs are to be kept low. Plastics materials which are less brittle at low temperatures are thus typically more expensive. Since the material between the lid assembly which is visible to the vehicle occupants and the further vehicle dashboard is to remain the same for aesthetic reasons, a cost-effective plastics material is preferable due to the use of the latter across a large area.

DESCRIPTION OF THE INVENTION

Proceeding from this situation, it is an object of the present invention to offer an airbag flap system having a lid assembly, wherein the airbag flap system enables the triggering of an airbag of a vehicle dashboard in a fragment-free manner at sub-zero temperatures, in particular at minus 35 degrees Celsius.

The object is achieved according to the invention by the features of the independent claims. Advantageous design embodiments of the invention are set forth in the dependent claims.

According to the invention, an airbag flap system having a cost-effective lid assembly for triggering an airbag of a vehicle dashboard in a fragment-free manner at sub-zero temperatures is thus specified.

Accordingly, the object is achieved by an airbag flap system for triggering an airbag of a vehicle dashboard in a fragment-free manner at sub-zero temperatures, having:

a lid assembly which points towards a vehicle interior and which comprises a polymer, wherein the lid assembly has a frame body having at least one flap segment which has peripheral depressions;

wherein the peripheral depressions generate at least one rectangular basic structure; and a deployment chute assembly which is connected to the lid assembly and comprises a polymer, wherein the deployment chute assembly has a main body and at least one flap body;

wherein the main body is configured so as to cover the frame body, and wherein the at least one flap body is configured so as to cover the at least one flap segment;

wherein the peripheral depressions of the rectangular basic structure of the lid assembly have at least two different material thicknesses.

The basic concept of the invention and individual elements of the subject matter of the invention claimed will be explained hereunder according to the terminology in the set of claims, and particularly preferable design embodiments of the subject matter of the invention will be described further hereunder. All of the explanations are descriptive and preferred but not limiting examples.

A substantial point of the invention lies in that components of the airbag flap system in the a sense of a door/lid/hinge combination are mutually adapted in such a manner that said components function, or trigger the airbag in a fragment-free manner, respectively, even at low temperatures while using brittle plastics materials. This is enabled by a clever design embodiment of the peripheral depressions as tear lines by way of a variable diminution of the material. As it has to be ensured that the lid assembly is not destroyed by the weight of objects placed on the vehicle dashboard, for example, stiffness is incorporated in the airbag flap system by way of the deployment chute assembly, and in particular by way of the flap body of the latter. This deployment chute assembly is connected to the lid assembly.

It is advantageous that tedious production steps such as subsequent laser machining of the lid assembly are dispensed with. Instead, the variable material thickness can be produced directly and using simple means in a manner true to the final shape, for example by a casting method.

The variable diminution of the material or of the peripheral depressions, respectively, has the technical effect that some peripheral depressions serve as opening depressions which open first, and other peripheral depressions serve as pivot depressions for flap segments or flap bodies, respectively, to be pivoted.

A peripheral depression configured as a pivot depression has the effect that a flap segment when triggering an airbag pivots about the respective axis of the pivot depression. In principle, the flap segment, or the flap segments, respectively, can be released from the frame body herein or remain connected to the latter. To the extent that a release takes place, a translatory movement is added to the pivoting movement.

Peripheral depressions configured as opening depressions have as predetermined breakage depressions the effect that the flap segment and flap body assembly when triggering an airbag is open in a controlled manner on account of the counterpressure of the airbag such that no undesirable fragmentation of material takes place.

In principle, it is to be assumed that the function of a peripheral depression as a pivot depression or an opening depression depends substantially on the material thickness of the corresponding peripheral depression. It has thus been established that the opening behaviour of the lid assembly and thus of the airbag flap system is conjointly determined by the selection of the material thickness of the corresponding peripheral depression.

A further influence lies in the disposal of the respective peripheral depression relative to the area of engagement of the counterpressure of the airbag.

An even further influence is the selection of material of the lid assembly and/or of the deployment chute assembly.

Temperatures below zero degrees Celsius are considered sub-zero temperatures. It is in particular provided that the airbag is triggered in a fragment-free manner between all of the temperature ranges between zero degrees Celsius and minus 35 degrees Celsius inclusive. It is provided herein that the airbag is likewise triggered in a fragment-free manner at temperatures above zero degrees Celsius, in particular up to at least 80 degrees Celsius. However, there is the problem that polymers, thus plastics materials, are brittle or have a negative impact resistance, respectively, in particular at temperatures below zero degrees Celsius.

A polymer is a chemical substance which is composed of macromolecules. The macromolecules of a substance are constructed from one or a plurality of structural units, the so-called constitutional repeat units or repeating units. In many cases, a polymer is composed of non-identical macromolecules since the number of repeating units and thus the molecular mass of the molecules varies. Synthetic or semi-synthetic polymers are a primary component for the production of plastics materials.

Fragment-free in the context of the invention means that no undesirable breakage of components of the airbag flap system takes place. There is typically the risk of materials breaking in a more brittle manner in particular at low temperatures, in particular below zero degrees Celsius than would be the case at temperatures above zero degrees Celsius. A brittle breakage of this type in an airbag flap system means that vehicle occupants can be injured by sharp-edged broken material when the airbag is triggered at low temperatures. Broken material of this type is composed of fragments of the components of the airbag flap system that have broken under the influence of temperature. The wording fragment-free accordingly means that no aforementioned breakage under the influence of temperature is created and additional, burst, broken material is thus absent.

The lid assembly pointing to a vehicle interior is the uppermost cover layer of the airbag flap system such that said lid assembly is also visually perceived by the vehicle occupants. The polymer is thus also to be understood to be a visible plastics material.

The vehicle interior is not part of the scope of protection and is set forth only for describing the assembly, in particular in order to illustrate that the lid assembly is that assembly of the airbag flap system that is visible to the vehicle occupants.

The complete vehicle dashboard is also not a component part of the scope of protection but serves as a point of orientation for the disposal of the airbag. This herein can in particular be a passenger airbag. However, in autonomously driving vehicles or in vehicles having an alternative steering system, for example, it is possible that the vehicle has a plurality of airbag flap systems according to the teaching of the invention. Said airbag flap systems can in particular be disposed on the vehicle dashboard.

The deployment chute assembly is provided for stabilizing the lid assembly which is mechanically weakened by the peripheral depressions. A main body of the deployment chute assembly herein is configured so as to cover the frame body of the lid assembly. Since the lid assembly, and thus also the frame body of the latter, are the components pointing towards the vehicle interior, the main body is disposed within a vehicle dashboard. The deployment chute assembly herein is configured for protecting the lid assembly in a supporting manner. For example, when heavy loads are placed on the vehicle dashboard, in particular on the airbag flap system, it could happen that the peripheral depressions would tear in the absence of any stabilizing. In a manner similar to that of the main body stabilizing the frame body, each of the two flap bodies covers in each case one flap segment in the stabilizing manner. The load acting on the lid assembly is thus relayed directly to the main body, or to the flap bodies of the deployment chute assembly, respectively, such that the risk of the peripheral depressions tearing is significantly reduced. The flap bodies for triggering the airbag are releasably connected to the main body, in particular by way of connection segments.

The peripheral depressions of the rectangular main structures of the lid assembly have at least two different material thicknesses. It can thus be controlled that in the event of the airbag being triggered the peripheral depressions having the thinner material thickness tear first, and subsequently the peripheral depressions having the greater, thus thicker, material thickness. By thus controlling the tearing of the peripheral depressions it can be avoided that stresses in, or between, components of the airbag flap system, in particular of the lid assembly and of the deployment chute assembly, lead to uncontrolled bursting or fragmenting, respectively. The load in the components is discharged by the de-stressing on account of the controlled tearing of the peripheral depressions. It can thus be circumvented that vehicle occupants are injured by components which are brittle for reasons of temperature.

The airbag flap system according to the teaching of the invention is thus suitable for triggering without fragmentation at temperatures up to and including minus 35 degrees Celsius, despite brittle plastics materials or despite brittle polymers or visible plastics materials, respectively. The airbag flap system moreover also functions in temperature ranges up to at least 80 degrees Celsius.

According to one advantageous embodiment of the invention it is provided that the two different material thicknesses of the peripheral depressions of the at least one rectangular basic structure are divided into a first material thickness and a second material thickness;

wherein the peripheral depressions having the first material thickness as opening depressions form at least one U-structure which has one transverse depression and two parallel depressions;

and wherein at least one further peripheral depression having the second material thickness which is greater than the first material thickness is configured as a pivot depression which extends in each case from one end of the first parallel depression to a respective opposite end of the second parallel depression. The rectangular basic structure is created on account thereof, wherein the U of the U-structure has a lesser material thickness, and the pivot depression which closes the U so as to form the rectangular basic structure, thus an O-structure, has a greater, thus a more massive, material thickness. The peripheral depressions of the U-structure, or the transverse depression and the two parallel depressions, respectively, thus open first. The triggered, or ejecting, respectively, airbag thus no longer presses in an uncontrolled manner against material which could or would consequently fragment, but first opens the peripheral depressions of the U-structure, whereupon the flap segment, or the flap segments, by way of the respective flap body thereof pivots/pivot about a respective axis which runs in each case along the pivot depression of said flap bodies.

According to one advantageous embodiment of the invention it is provided that the lid assembly has two flap segments which have the peripheral depressions;

wherein the two flap segments are disposed so as to mutually abut in such a manner that the peripheral depressions thereof generate two adjacent rectangular basic structures; and that the deployment chute assembly has two flap bodies;

wherein one flap body is in each case configured so as to cover one flap segment;

wherein the peripheral depressions of the rectangular basic structures of the lid assembly have at least two different material thicknesses. The disposal of two flap segments enables the airbag to egress from the airbag flap system in a relatively central manner.

The lid assembly has a frame body which has two flap segments. These flap segments are mutually adjacent in such a manner that two adjacent rectangular basic structures are created. In other words, a contour which approximately corresponds to a figure eight or the Greek capital letter Theta is generated. The rectangular basic structures herein are in particular disposed in such a manner that any potential axes of main extent are disposed so as to be mutually parallel. The respective basic structure mimics a rectangle even when the external corners of said basic structure are optionally radiused. This also means that this may be a square basic structure or planar basic structure with rounded features. The wording rectangular basic structures is thus an approximate description without any directly limiting meaning.

According to one advantageous design embodiment of the invention it is provided that the two different material thicknesses of the peripheral depressions of the adjacent rectangular basic structures are divided into a first material thickness and a second material thickness;

wherein the peripheral depressions having the first material thickness as opening depressions form at least one H-structure which has one transverse depression and two parallel depressions;

and wherein the peripheral depressions having the second material thickness which is larger than the first material thickness are configured as two pivot depressions which extend in each case from one end of a first parallel depression to a respective opposite end of the second parallel depression. The two adjacent rectangular basic structures are generated on account thereof, wherein the H of the H-structure has a lesser material thickness, and the two pivot depressions which close the H so as to form two rectangular basic structures have a greater, thus a more massive, material thickness. The peripheral depressions of the H-structure, or the transverse depression and the two parallel depressions, respectively, thus open first. The triggered, or ejecting, respectively, airbag thus no longer presses in an uncontrolled manner against material which could or would consequently fragment, but first opens the peripheral depressions of the H-structure, whereupon the flap segments by way of the respective flap body thereof pivot about a respective axis which runs in each case along the pivot depression of said flap bodies. It can arise herein that the flap segments and/or the respective flap bodies thereof are likewise released from the frame body or the main body, respectively, wherein this on account of the pivoting procedure takes place in such a manner that the vehicle occupants do not collide with the components that are potentially released. The reason therefore lies in particular in that the airbag penetrates the opening being created more rapidly than the components can be completely released such that the airbag is the component closest to the vehicle occupant. Optionally, the flap segments and/or the respective flap bodies thereof can also remain so as to be disposed on the airbag flap system by way of a physical connection while and after the airbag is triggered. In any case, this is fragment-free triggering.

According to one advantageous embodiment of the invention it is provided that the opening depressions along external corners of the one or both adjacent rectangular basic structure/structures are disposed in such a manner that the opening depressions extend at least partially across a respective defined distance along a respective axis of the pivot depressions. This means that the pivot depressions which close off the H-structure in relation to the two rectangular basic structures along the axis of said pivot depressions are shortened in such a manner that a proportion of the peripheral depressions along the axes of the pivot depressions are configured as opening depressions. It has been established that it can be avoided in particular on account thereof that any potential fragments break out of the corner regions of the frame body or of the flap segments. Instead of a force transmission under tension, de-stressing takes place on account of the peripheral depressions tearing in the corner regions. The risk of injury to vehicle occupants is thus even further reduced.

According to one advantageous embodiment of the afore-mentioned invention it is provided that the defined distances of the opening depressions along a respective axis of the pivot depressions are between two millimetres inclusive and ten millimetres inclusive, preferably seven millimetres. It has been established that reliable pivoting of the flap segments is possible in this order and the fragmentation of said flap segments is moreover suppressed at low temperatures.

According to one advantageous embodiment of one of the afore-mentioned inventions it is provided that the external corners are radiused. An advantageous distribution of forces results on account thereof such that the fragmentation at low temperatures is suppressed.

According to one advantageous embodiment of the invention it is provided that the second material thickness is greater than the first material thickness by a factor between two inclusive and four inclusive, preferably by a factor of three. It has been established that larger deviations can have a negative influence on the controlled initial tearing of the first peripheral depressions, and that smaller deviations can lead to simultaneous tearing of the peripheral depressions. Particularly reliable results have been demonstrated at a first material thickness of 0.2 millimetres and a second material thickness of 0.6 millimetres.

The measurement of a material thickness herein takes place in each case at the point of the lowest material thickness.

According to one advantageous embodiment of the invention it is provided that at least one flap segment, preferably two flap segments, when triggering the airbag is/are released from the frame body so as to pivot in each case about an axis of a respective pivot depression. However, this is not considered to be a fragment in the context of the invention. An advantage herein lies in that no additional effort has to be made in order for the flap segments to be held on the frame body. Nevertheless, the vehicle occupants are not injured since the inflating airbag penetrates the depressions that open first and is thus disposed between a vehicle occupant and the flap segments.

According to one advantageous embodiment of the invention it is provided that at least one flap segment, preferably two flap segments, when triggering the airbag moves/move on the frame body so as to pivot in each case about an axis of a respective pivot depression. One or both flap segments thus remains/remain connected to the lid assembly. It is advantageous herein that it can be prevented during the triggering of the airbag that a flap segment reaches a vehicle occupant so as to injure the latter even in the case of an unusual position of the respective vehicle occupant to be protected.

It is also possible for a flap segment to remain on the frame body and for the second flap segment to be released from the frame body on account of the airbag being triggered.

According to one advantageous embodiment of the invention it is provided that the peripheral depressions on the face of the lid assembly that is distal from a vehicle interior have a tipped contour, in particular a triangular contour which by way of a tip points towards the vehicle interior. The tip which runs along the peripheral depressions enables a targeted expansion of tears such that it is ensured that an initial material failure of the lid assembly takes place in a controlled manner at the points of the thinnest material. This thus optimizes the opening of the airbag flap system.

According to one advantageous embodiment of the invention it is provided that the peripheral depressions on a face of the lid assembly that is proximal to a vehicle interior have a contour, in particular a U-contour, which by way of a convexity points away from the vehicle interior. The convexity having a contour that points away from the vehicle interior means in other words that said convexity is disposed so as to bulge in a manner pointing towards the deployment chute assembly. This has an aesthetically pleasing effect, on the one hand. On the other hand, an inwardly bulging peripheral depression is easy to clean such that it can be avoided in the event of the airbag being triggered that a vehicle occupant is injured by sharp particles in the peripheral depression. It can moreover be ensured on account thereof that the creation of tears at the peripheral depressions takes place with greater reliability.

According to one advantageous embodiment of the invention it is provided that the lid assembly and the deployment chute assembly are connected to one another by way of centring ribs and/or by way of welding towers, wherein the centring ribs and/or welding towers from a face of the lid assembly that is distal from a vehicle interior extend in particular in the direction of the deployment chute assembly, wherein the deployment chute assembly has connection openings for connecting to the centring ribs and/or to the welding towers. This herein is a cost-effective and moreover reliable possibility for a connection between the lid assembly and the deployment chute assembly. It has been established that a sufficiently positive transmission of force between the lid assembly and the deployment chute assembly takes place in such a manner that any unintentional tearing of the peripheral depressions is suppressed.

According to one advantageous embodiment of the invention it is provided that the two flap bodies are connected to one another and/or to the main body by way of connection segments. A basic stability which when required, specifically when triggering the airbag, can be rapidly released again, can be achieved on account of these connection segments. To this end it is in particular provided that the connection segments are mutually spaced apart such that weight is saved and the functionality is nevertheless preserved.

According to one advantageous embodiment of the invention it is provided that the lid assembly and/or the deployment chute assembly are/is partially or completely composed of a thermoplastic polymer. This is a cost-effective choice of material which can be reliably used in large volumes. Thermosetting plastics materials or other plastics materials are also possible.

According to one advantageous embodiment of the invention it is provided that the polymer of the lid assembly and/or of the deployment chute assembly as a mixture comprises at least one thermoplastic polycarbonate (PC) and at least one thermoplastic ter-polymer, wherein the proportion of the PC in the mixture is preferably between 10 percent by weight inclusive and 90 percent by weight inclusive, and/or the proportion of the thermoplastic terpolymer in the mixture is preferably between 10 percent by weight inclusive and 90 percent by weight inclusive. It has been established that a sufficient stability of the airbag flap system is possible in the case of this material mixture, wherein cost-effective procuring as well as processing of the material mixture is possible. The entire vehicle dashboard can thus in particular be coated across a large area with this material mixture in the region which is of visual relevance, said material mixture being cost effective and in conjunction with the further features of the invention nevertheless enabling the object according to the invention to be achieved.

According to one advantageous embodiment of the afore-mentioned invention it is provided that the thermoplastic terpolymer is acrylonitrile butadiene styrene (ABS) such that the mixture is a mixture of at least polycarbonate and acrylonitrile butadiene styrene (PC/ABS). This is a particularly preferred material mixture, in particular with a view to the price, the availability, and the ability to be produced in large volumes. Nevertheless, fragmentation at low temperatures can be avoided in conjunction with the peripheral depressions of variable material thickness.

Polycarbonates (PC) are thermoplastic plastics materials or thermoplastic polymers, respectively. In formal terms, said polycarbonates are an ester of carbonic acid. The production of polycarbonates can take place by polycondensation of phosgene with diols. Aromatic bishydroxy compounds such as bisphenol A have in particular practical relevance in terms of synthesis. As an alternative to the fundamentally hazardous phosgene, transesterification can also take place using carbonic diesters. Polycarbonates typically have a crystallite proportion of less than five percent by weight and therefore are considered amorphous. They are distinguished by high strength, impact resistance, stiffness, and hardness. Polycarbonates are moreover good insulators in relation to an electric current. Polycarbonates are resistant in relation to water, many mineral acids, and aqueous solutions of neutral salts and oxidants. Some non-polar organic solvents such as hydrocarbons and many types of oil and grease are also not aggressive towards polycarbonates.

Acrylonitrile butadiene styrene copolymers, ABS, are thermoplastic terpolymers in which covalent branched chains of styrene acrylonitrile copolymer (SAN) are linked to a polybutadiene-based primary chain. Since the two components are not mutually soluble, a microphase separation arises which on account of the embedded soft polybutadiene particles in the continuous brittle SAN main phase increases the impact resistance of the material. The proportions of the monomers used typically vary in the range of 5 to 30 percent by weight of butadiene, as well as 15 to 35 percent by weight of acrylonitrile, and 40 to 60 percent by weight of styrene. ISO standard ISO 472:2013(de) refers to acrylonitrile butadiene styrene plastics material as a plastics material from terpolymers and/or mixtures of polymers and copolymers produced from acrylonitrile, butadiene, and styrene. As an industrial plastics material, ABS very often is composed of a material mixture of the terpolymer and the pure hard component SAN, since the mean molecular weight is significantly reduced and the processing capability is thus improved on account thereof at the same rigid phase/soft phase fraction and the same molecular weight of the PB soft phase. The material in this instance is composed of a PB core and the graft shell and the SAN matrix, the two latter being dissolved in one another. Variants in which nitrile rubber (poly-(butadiene-stat-acrylonitrile)) or SBR (poly-(styrene-cobutadiene)) are used instead of a pure PB primary chain are also known. The (partial) use of methyl styrene instead of styrene increases the temperature resistance of the material (higher glass transition temperature of the (M)SAN phase), likewise the copolymerization of styrene with maleic anhydride). Transparent variants are obtained when the refractive index of the rigid phase is adapted to that of the PB soft phase by copolymerization with methyl methacrylate. For improved environmental stability the PB which is sensitive to UV and ozone can in particular be replaced by EPDM.

Moreover according to the invention is a lid assembly for an afore-mentioned airbag flap system having the afore-mentioned features of the lid assembly.

Furthermore according to the invention is a deployment chute assembly for an afore-mentioned airbag flap system having the afore-mentioned features of the deployment chute assembly.

BRIEF DESCRIPTION OF THE DRAWINGS

The invention will be explained in more detail hereunder by means of preferred exemplary embodiments with reference to the appended drawings in which:

FIG. 6a shows a front view of the lid assembly according to FIG. 3 having illustrated peripheral depressions, wherein pivot depressions of the peripheral depressions are illustrated in a highlighted manner;

FIG. 6b shows a front view of the lid assembly according to FIG. 3 having illustrated peripheral depressions, wherein opening depressions of the peripheral depressions are illustrated in a highlighted manner;

FIG. 7a shows a detailed view of a pivot depression having a schematic cross section according to FIG. 6a illustrated so as to be embedded therein;

FIG. 7b shows a detailed view of an opening depression having a schematic cross section according to FIG. 6b illustrated so as to be embedded therein;

DETAILED DESCRIPTION OF THE EXEMPLARY EMBODIMENTS

Figure 1:
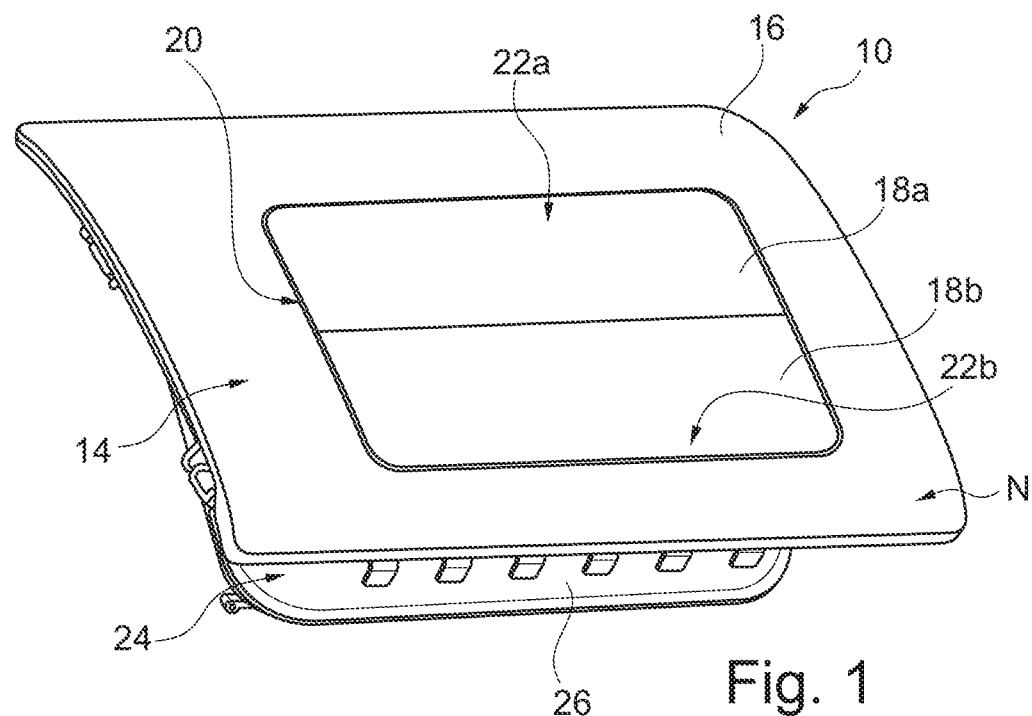
FIG. 1 shows a schematic view of an airbag flap system according to a preferred embodiment of the invention.

The exemplary embodiments described are merely examples which in the context of the claims can be modified and/or enhanced in many ways. Each feature which has been described for a specific exemplary embodiment can be utilized individually or in combination with other features in any other exemplary embodiment. Each feature which has been described for an exemplary embodiment of a specific category can in an analogous manner also be used in an exemplary embodiment of another category.

A preferred embodiment of an airbag flap system 10 is illustrated in FIGS. 1 to 9. Said airbag flap system 10 is configured for triggering an airbag of a vehicle dashboard 12 in a fragment-free manner at sub-zero temperatures, and has:

a lid assembly 14 which points towards a vehicle interior and which comprises a polymer, wherein the lid assembly 14 has a frame body 16 having two flap segments 18a, 18b which have peripheral depressions 20;

wherein the two flap segments 18a, 18b are disposed so as to mutually abut in such a manner that their peripheral depressions 20 thereof generate two adjacent rectangular basic structures 22a, 22b; and a deployment chute assembly 24 which is connected to the lid assembly 14 and which comprises a polymer, wherein the deployment chute assembly 24 has a main body 26 and two flap bodies 28a, 28b;

wherein the main body 26 is configured so as to cover the frame body 16, and wherein one flap body 28a, 28b is in each case configured so as to cover one flap segment 18a, 18b;

wherein the peripheral depressions 20 of the rectangular basic structures 22a, 22b of the lid assembly 14 have at least two different material thicknesses A1, A2.

FIG. 1 shows the airbag flap system 10 in a perspective view. The lid assembly 14 and the deployment chute assembly 24 herein are joined so as to form the airbag flap system 10. The region that in the installed state of the airbag flap system 10 is visible to vehicle occupants is primarily illustrated. The region, in particular the rear side, that in the installed state of the air flap system 10 is not visible to vehicle occupants is illustrated in FIG. 5.

Figure 3:
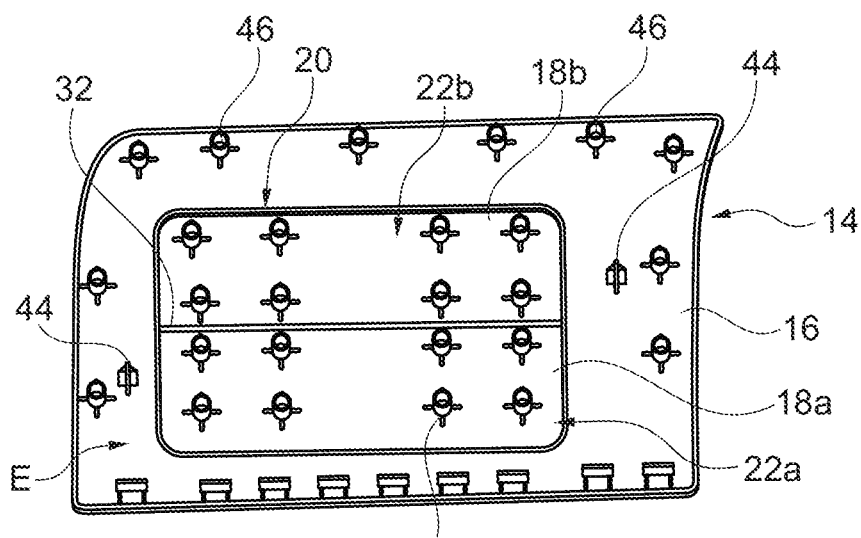
FIG. 3 shows a rear view of a lid assembly of the airbag flap system according to FIG. 1.
Figure 4:
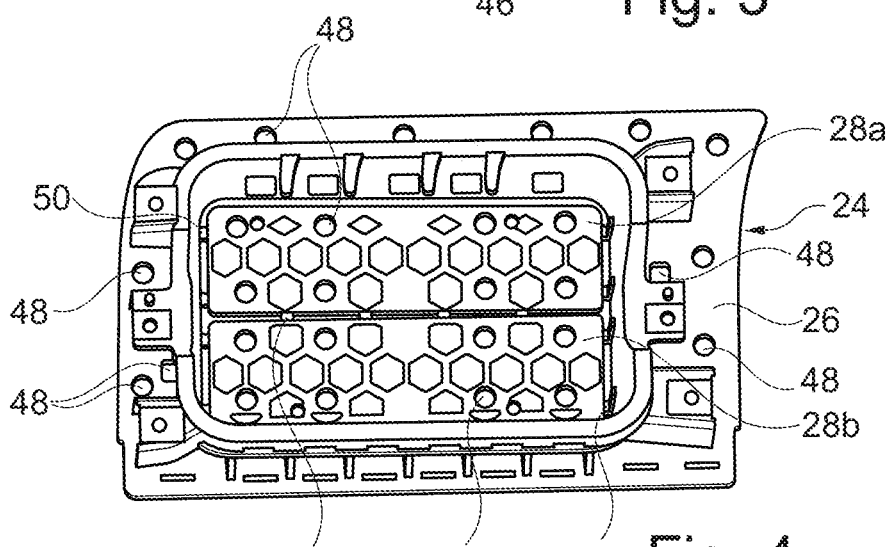
FIG. 4 shows a rear view of a deployment chute assembly of the airbag flap system according to FIG. 1.
Figure 5:
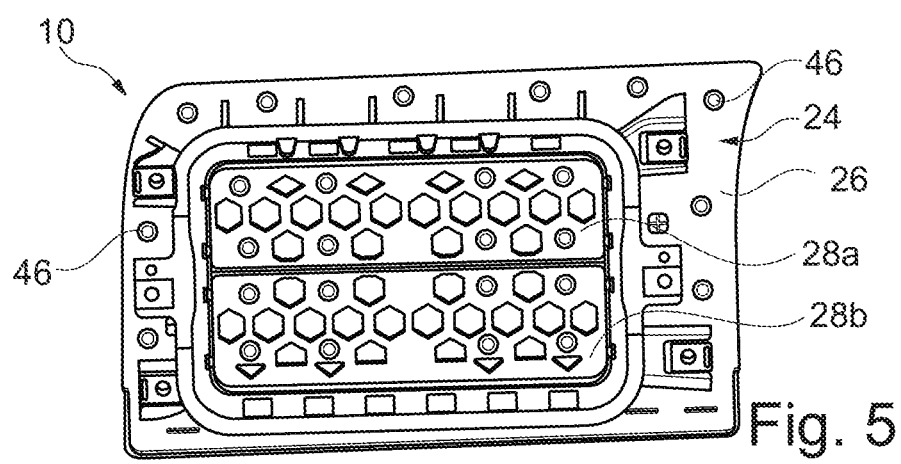
FIG. 5 shows a rear view of the lid assembly according to FIG. 3, said lid assembly being connected to the deployment chute assembly according to FIG. 4.

In a manner analogous to the view of the rear side of the assembled airbag flap system 10, FIG. 3 in the perspective identical to that of FIG. 5 shows a rear side of the lid assembly 14, and FIG. 4 shows a rear side of the deployment chute assembly 24.

Figure 2:
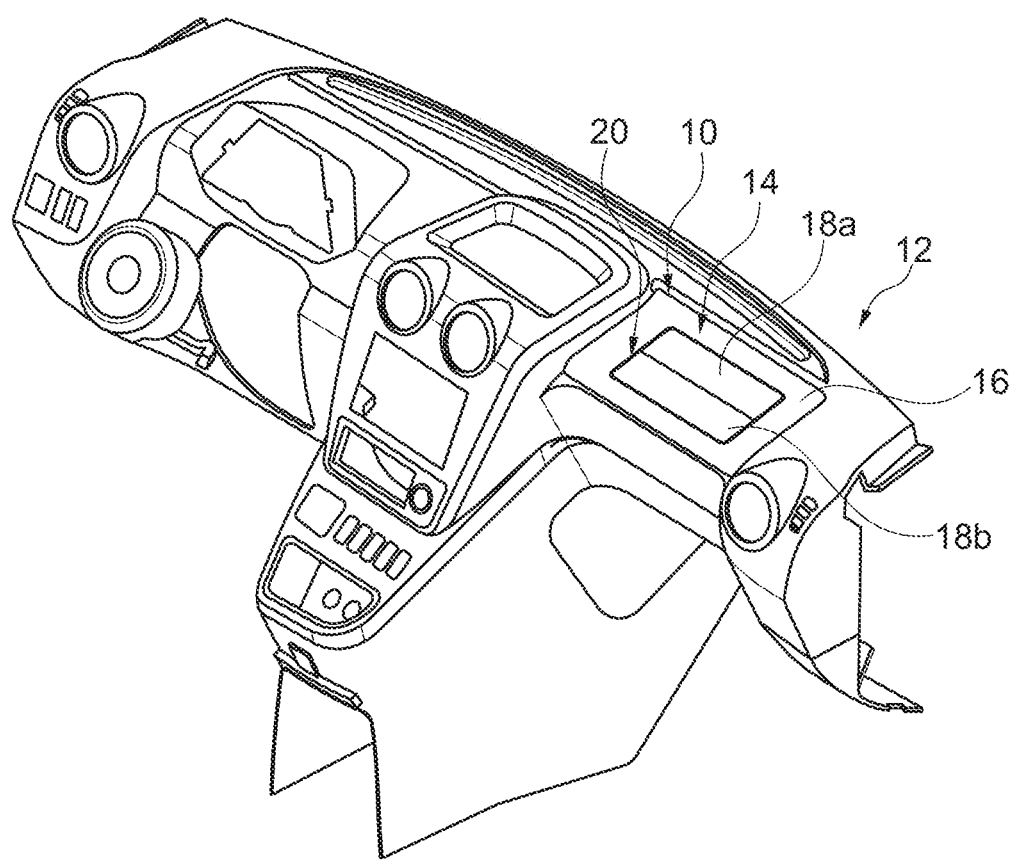
FIG. 2 shows a schematic view of a vehicle dashboard having the airbag flap system according to FIG. 1.

The airbag flap system 10 in FIG. 2 is illustrated in an exemplary manner in the state installed in a vehicle dashboard.

A comparison of FIGS. 7a and 7b shows in particular that the two different material thicknesses A1, A2 of the peripheral depressions 20 of the adjacent rectangular basic structures 22a, 22b are divided into a first material thickness A1 and a second material thickness A2;

wherein the peripheral depressions 20 having the first material thickness A1 as opening depressions 30 form at least one H-structure which has one transverse depression 30 and two parallel depressions 34a, 34b;

and wherein the peripheral depressions 20 having the second material thickness A2 which is greater than the first material thickness A1 are configured as two pivot depressions 36a, 36b which extend in each case from one end 34a1, 34b1 of a first parallel depression 34a to a respective opposite end 34a2, 34b2 of the second parallel depression 34b.

It is pointed out that the H-structure illustrated in an exemplary manner comprises a U-structure. Features of a rectangular basic structure 22a, 22b can likewise also be applied to two rectangular basic structures 22a, 22b. There is no separate graphic representation of a further exemplary embodiment having a single U-structure and/or a single rectangular basic structure 22a, 22b.

Figure 8:
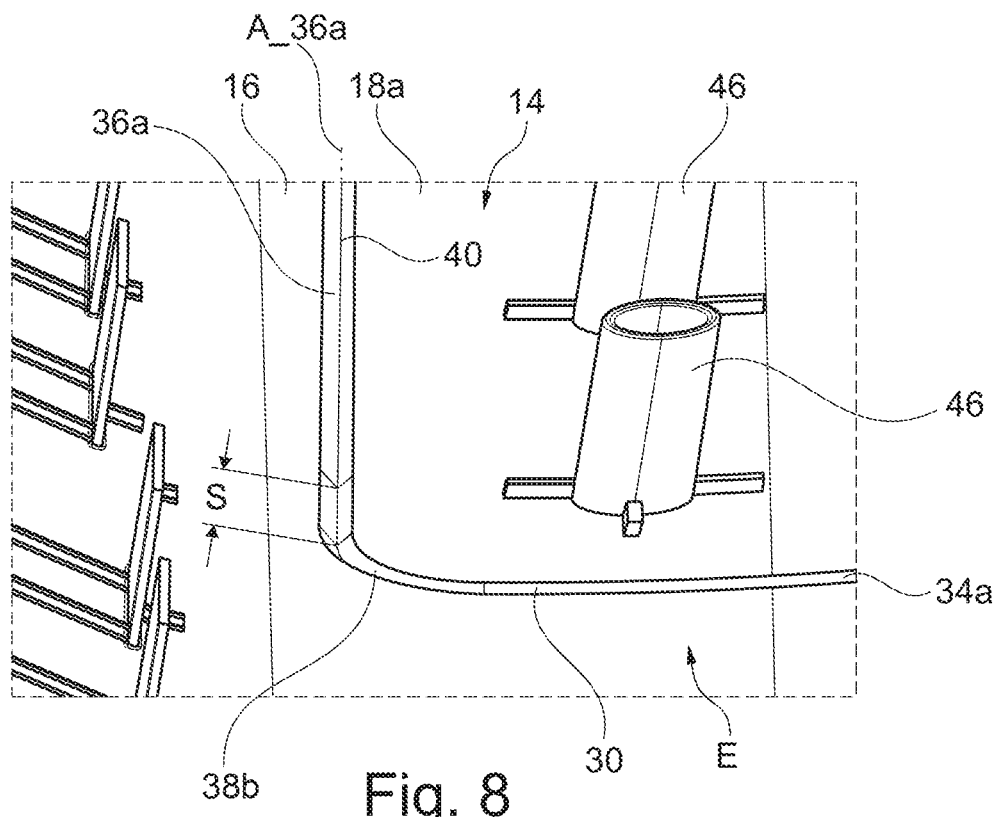
FIG. 8 shows a detailed view of the peripheral depressions of the rear view of the lid assembly according to FIG. 3.

As is illustrated in an enlarged and an exemplary manner for a defined distance S in FIG. 8, it is preferable for the defined distances S of the opening depressions 30 along a respective axis A_36a, A_36b of the pivot depressions 36a, 36b to be between two millimetres inclusive and ten millimetres inclusive, preferably seven millimetres.

As can be seen in a symbolic manner from FIGS. 7a and 7b, it is preferable for the second material thickness A2 to be greater than the first material thickness A1 by a factor between two inclusive and four inclusive, preferably by a factor of three.

The first material thickness A1 according to the exemplary illustration according to FIG. 7b is 0.2 millimetres. It is in particular provided according to FIG. 7a that the second material thickness A2 is 0.6 millimetres, for example. To the extent that an airbag is now being triggered, said airbag is initially pressed against the side of the airbag flap system 10 of the face E of the lid assembly 14 that is distal from the vehicle interior and thus pressed against the deployment chute assembly 24. The pressure that is being steadily built up leads to the peripheral depressions 20 tearing. The frame body 16, the two flap segments 18a, 18b, the main body 26, and the two flap bodies 28a, 28b do not fragment per se. This means that said components can indeed move relative to one another so as to allow the triggered airbag to eject from the airbag flap system 10; however, the components do not break into sharp-edged individual parts which should protect a vehicle occupant to be protected by the airbag. The tearing of the peripheral depressions 20 takes place in such a manner that the opening depressions 30 tear first, as has already been described above. The airbag urging through the region of the opening transverse depression 32 displaces the flap segments 18a, 18b and the flap bodies 28a, 28b which are connected to the latter. Said flap bodies 28a, 28b pivot about the axis of the first pivot depression A_36a and the second pivot depression A_36a, respectively, and enable the airbag to completely exit as required in order to protect the vehicle occupant.

According to FIG. 6b, the flap segments 18a, 18b and the flap bodies 28a, 28b which are connected to the latter by way of in each case three edges are completely adjacent to opening depressions 30. A common opening depression 30 of the flap segments 18a, 18b forms the transverse depression 32. In a manner perpendicular to the transverse depression 32, the flap segments 18a, 18b and the flap bodies 28a, 28b which are connected to the latter share a first and a second parallel depression 34a, 34b. The first end of the first parallel depression 34a1 is disposed so as to be opposite the first end of the second parallel depression 34b1. The second end of the first parallel depression 34a2 is disposed so as to be opposite the second end of the second parallel depression 34b2.

Figure 9:
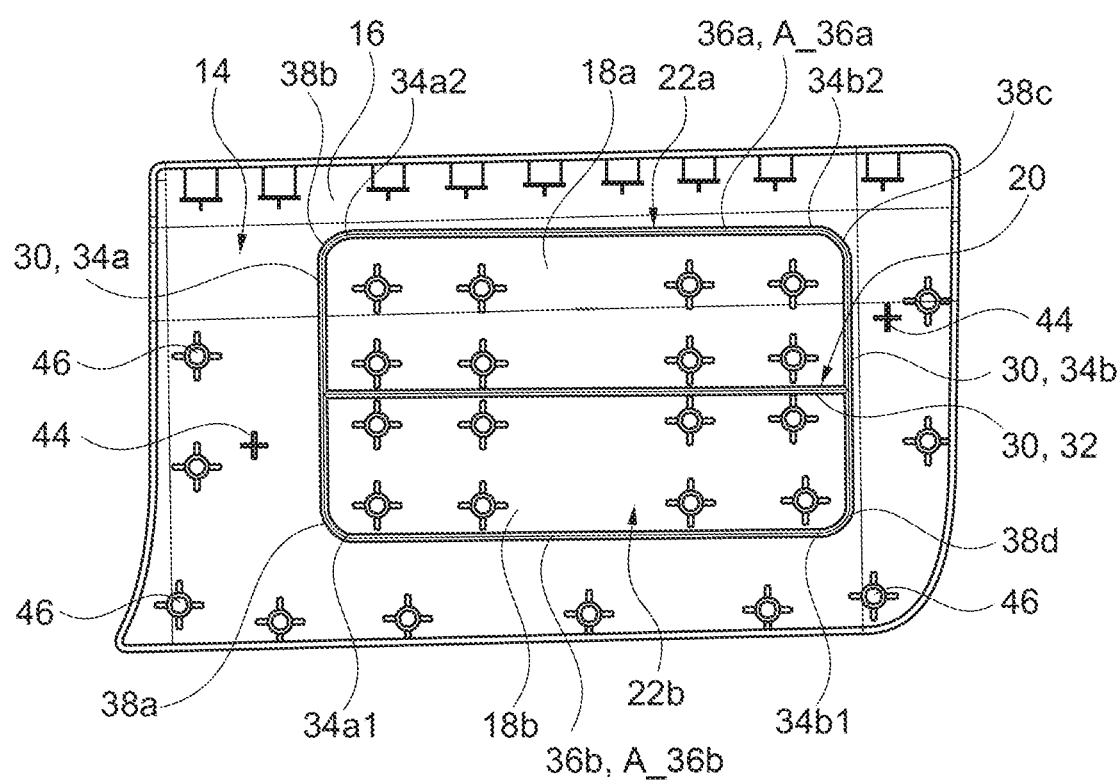
FIG. 9 shows a rear view of the lid assembly according to FIG. 3, having peripheral depressions illustrated in a highlighted manner.

A collective view of FIGS. 6b, 8 and 9 discloses that the opening depressions 30 along external corners 38a, 38b, 38c, 38d of the two adjacent rectangular basic structures 22a, 22b are disposed in such a manner that the opening depressions 30 extend at least partially across a respective defined distance S along a respective axis A_36a, A_36b of the pivot depressions 36a, 36b. It is disclosed in a readily visible manner in FIG. 9 that the external corners 38a, 38b, 38c, 38d are radiused. The opening depressions 30 herein are disposed in the H-structure and after the profile of the external corners 38a, 38b, 38c, 38d and the respective defined distance S transition to one of the pivot depressions 36a, 36b. The pivot depressions 36a, 38b are in particular disposed to as to be parallel to the transverse depression 32, see FIG. 6a.

The pivot depressions 36a, 36b in FIG. 6a herein are highlighted in a symbolic manner by more solid lines, whereas the opening depressions 30 in FIG. 6b are highlighted in a symbolic manner by more solid lines.

While not illustrated in more detail in the figures, it is in principle preferable for at least one flap segment 18a, 18b, preferably two flap segments 18a, 18b, when triggering the airbag to be released from the frame body 16 so as to pivot in each case about an axis A_36a, A_36b of a respective pivot depression 36a, 36b.

While not illustrated in more detail in the figures, it is alternatively or additionally preferable for at least one flap segment 18a, 18b, preferably two flap segments 18a, 18b, when triggering the airbag to move on the frame body 16 so as to pivot about an axis A_36a, A_36b of a respective pivot depression 36a, 36b.

It can optionally also be provided that the first flap segment 18a when triggering the airbag, while remaining on the frame body 16, moves so as to pivot about the axis A_36a of said first flap segment 18a of the pivot depression 36a of the latter, and the second flap segment 18b when triggering the airbag, is in each case released from the frame body 17 so as to pivot about the axis A_36 of said second flap segment 18b of the pivot depression 36b of the latter. The assignment of the first flap segment 18a and the second flap segment 18b herein is not relevant.

In the cross-sectional illustrations in FIGS. 7a, 7b and in the exemplary embodiment in FIG. 8 it is illustrated in a symbolic manner that the peripheral depressions 20 on a face E of the lid assembly 14 that is distal from the vehicle interior have a tipped contour, in particular a triangular contour, which by way of a tip 40 points toward the vehicle interior. The symbolized cross-sectional illustrations herein superimpose the lid assembly 14 having the respective peripheral depressions 20.

In the cross-sectional illustrations in FIGS. 7a, 7b it is illustrated in a symbolic manner that the peripheral depressions 20 on a face N of the lid assembly 14 that is proximal to the vehicle interior have a contour, in particular a U-contour, which points away from the vehicle interior.

It can be seen in particular in FIG. 5 that the lid assembly 14 and the deployment chute assembly 24 are connected to one another by way of centring ribs 44 and/or by way of welding towers 46, wherein the centring ribs 44 and/or welding towers 46 from a face E of the lid assembly 14 that is distal from a vehicle interior extend in particular in the direction of the deployment chute assembly 24, wherein the deployment chute assembly 24 has connection openings 48 for connecting to the centring ribs 44 and/or to the welding towers 46.

LIST OF REFERENCE SIGNS

| | |
|---|---|
| Airbag flap system | 10 |
| Vehicle dashboard | 12 |
| Lid assembly | 14 |
| Frame body | 16 |
| First flap segment | 18a |
| Second flap segment | 18b |
| Peripheral depressions | 20 |
| First rectangular basic structure | 22a |
| Second rectangular basic structure | 22b |
| Deployment chute assembly | 24 |
| Main body | 26 |
| First flap body | 28a |
| Second flap body | 28b |
| Opening depressions | 30 |
| Transverse depression | 32 |
| First parallel depression | 34a |
| First end of the first parallel depression | 34a1 |
| Second end of the first parallel depression | 34a2 |
| Second parallel depression | 34b |
| First end of the second parallel depression | 34b1 |
| Second end of the second parallel depression | 34b2 |
| First pivot depression | 36a |
| Second pivot depression | 36b |
| External corners | 38a, 38b, 38c, 38d |
| Tip | 40 |
| Convexity | 42 |
| Centring ribs | 44 |
| Welding towers | 46 |
| Connection openings | 48 |
| Connection segments | 50 |
| First material thickness | A1 |
| Second material thickness | A2 |
| Defined distances | S |
| Axis of the first pivot depression | A_36a |
| Axis of the second pivot depression | A_36b |
| Face of the lid assembly distal from a vehicle interior | E |
| Face of the lid assembly proximal to a vehicle interior | N |

The invention claimed is:

1. Airbag flap system for triggering an airbag of a vehicle dashboard in a fragment-free manner at sub-zero temperatures, having:
a lid assembly which points towards a vehicle interior and which comprises a polymer, wherein the lid assembly has a frame body having at least one flap segment which has peripheral depressions;
wherein the peripheral depressions generate at least one rectangular basic structure; and
a deployment chute assembly which is connected to the lid assembly and comprises a polymer, wherein the deployment chute assembly has a main body and at least one flap body;
wherein the main body is configured so as to cover the frame body, and wherein the at least one flap body is configured so as to cover the at least one flap segment;
wherein the peripheral depressions of the rectangular basic structure of the lid assembly have at least two different material thicknesses;
wherein the two different material thicknesses of the peripheral depressions of the at least one rectangular basic structure are divided into a first material thickness and a second material thickness;
wherein the peripheral depressions having the first material thickness as opening depressions form at least one U-structure which has one transverse depression and two parallel depressions;
wherein at least one further peripheral depression having the second material thickness which is greater than the first material thickness is configured as a pivot depression which extends in each case from one end of a first parallel depression to a respective opposite end of a second parallel depression; and
wherein the opening depressions along external corners of the one or both adjacent rectangular basic structure/structures are disposed in such a manner that the opening depressions extend at least partially across a respective defined distance along a respective axis of the pivot depressions.

2. Airbag flap system according to claim 1, wherein the lid assembly has two flap segments which have the peripheral depressions;
wherein the two flap segments are disposed so as to mutually abut in such a manner that the peripheral depressions thereof generate two adjacent rectangular basic structures; and in that the deployment chute assembly has two flap bodies;
wherein one flap body is in each case configured so as to cover in each case one flap segment;
wherein the peripheral depressions of the rectangular basic structures of the lid assembly have at least two different material thicknesses.

3. Airbag flap system according to claim 2, wherein the two different material thicknesses of the peripheral depressions of the adjacent rectangular basic structures are divided into a first material thickness and a second material thickness; wherein the peripheral depressions having the first material thickness as opening depressions form at least one H-structure which has one transverse depression and two parallel depressions; and wherein the peripheral depressions having the second material thickness which is greater than the first material thickness are configured as two pivot depressions which extend in each case from one end of a first parallel depression to a respective opposite end of a second parallel depression.

4. Airbag flap system according to claim 1, wherein the defined distances of the opening depressions along a respective axis of the pivot depressions are between two millimetres inclusive and ten millimetres inclusive or seven millimetres.

5. Airbag flap system according to claim 1, wherein the external corners are radiused.

6. Airbag flap system according to claim 1, wherein the second material thickness is greater than the first material thickness by a factor between two inclusive and four inclusive or by a factor of three.

7. Airbag flap system according to claim 1, wherein at least one flap segment or two flap segments, when triggering the airbag, is/are released from the frame body so as to pivot in each case about an axis of a respective pivot depression.

8. Airbag flap system according to claim 1, wherein at least one flap segment or two flap segments, when triggering the airbag, moves/move on the frame body so as to pivot in each case about an axis of a respective pivot depression.

9. Airbag flap system according to claim 1, wherein the peripheral depressions on a face of the lid assembly that is distal from a vehicle interior have a tipped contour or a triangular contour, which by way of a tip points towards the vehicle interior.

10. Airbag flap system according to claim 1, wherein the peripheral depressions on a face of the lid assembly that is proximal to a vehicle interior have a contour or a U-contour, which by way of a convexity points away from the vehicle interior.

11. Airbag flap system according to claim 1, wherein the lid assembly and the deployment chute assembly are connected to one another by way of centring ribs and/or by way of welding towers, wherein the centring ribs and/or welding towers extend in the direction of the deployment chute assembly, wherein the deployment chute assembly has connection openings for connecting to the centring ribs and/or to the welding towers.

12. Airbag flap system according to claim 11, wherein the centring ribs and/or welding towers extend from a face of the lid assembly that is distal from the vehicle interior in the direction of the deployment chute assembly.

13. Airbag flap system according to claim 1, wherein the two flap bodies are connected to one another and/or to the main body by way of connections segments, wherein the connection segments are spaced apart.

14. Airbag flap system according to claim 13, wherein the connection segments are mutually spaced apart.

15. Lid assembly for an airbag flap system according to claim 1.

16. Deployment chute assembly for an airbag flap system according to claim 1.

* * * * *